(12) United States Patent
Kakinuma et al.

(10) Patent No.: US 10,180,756 B2
(45) Date of Patent: Jan. 15, 2019

(54) INPUT APPARATUS

(71) Applicant: TOYOTA JIDOSHA KABUSHIKI KAISHA, Toyota-shi, Aichi-ken (JP)

(72) Inventors: Shoji Kakinuma, Okazaki (JP); Hiroshi Shikata, Nisshin (JP); Ryota Hamabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 15/210,540

(22) Filed: Jul. 14, 2016

(65) Prior Publication Data

US 2017/0024076 A1  Jan. 26, 2017

(30) Foreign Application Priority Data

Jul. 21, 2015  (JP) .................. 2015-144299

(51) Int. Cl.
| | |
|---|---|
| *G06F 3/041* | (2006.01) |
| *G06F 3/0354* | (2013.01) |
| *G06F 3/0488* | (2013.01) |
| *G06F 3/0481* | (2013.01) |
| *G06F 3/038* | (2013.01) |
| *G06F 3/033* | (2013.01) |

(52) U.S. Cl.
CPC ........ *G06F 3/0418* (2013.01); *G06F 3/03547* (2013.01); *G06F 3/0488* (2013.01); *G06F 3/04812* (2013.01); *G06F 3/033* (2013.01); *G06F 3/038* (2013.01); *G06F 3/041* (2013.01); *G06F 3/0412* (2013.01); *G06F 3/0416* (2013.01); *G06F 3/0481* (2013.01)

(58) Field of Classification Search
None
See application file for complete search history.

(56) References Cited

U.S. PATENT DOCUMENTS

| | | |
|---|---|---|
| 2008/0231608 A1 | 9/2008 | Nagata |
| 2012/0212429 A1 | 8/2012 | Okura et al. |
| 2013/0187878 A1 | 7/2013 | Muikaichi |
| 2013/0271487 A1 | 10/2013 | Lincoln |

FOREIGN PATENT DOCUMENTS

| | | |
|---|---|---|
| JP | 2008-234594 A | 10/2008 |
| JP | 2011-103044 A | 5/2011 |
| JP | 2013-156980 A | 8/2013 |

*Primary Examiner* — Brian Butcher
(74) *Attorney, Agent, or Firm* — Oliff PLC

(57) ABSTRACT

An input apparatus includes: a touchpad that detects an input position; a display unit; and a calculation device configured to: move a display position of a cursor in steps in an identical direction to a variation direction of the input position detected by the touchpad every time the input position varies in an identical direction by a predetermined unit amount; calculate the number of movement steps and the adjustment amount by dividing a value by the predetermined unit amount when the variation direction of the input position calculated during a first predetermined period is equal to a variation direction of the input position calculated during a second predetermined period, the value obtained by adding the adjustment amount calculated during the second predetermined period to the displacement amount calculated during the first predetermined period, the second predetermined period being a predetermined period immediately preceding the first predetermined period.

4 Claims, 10 Drawing Sheets

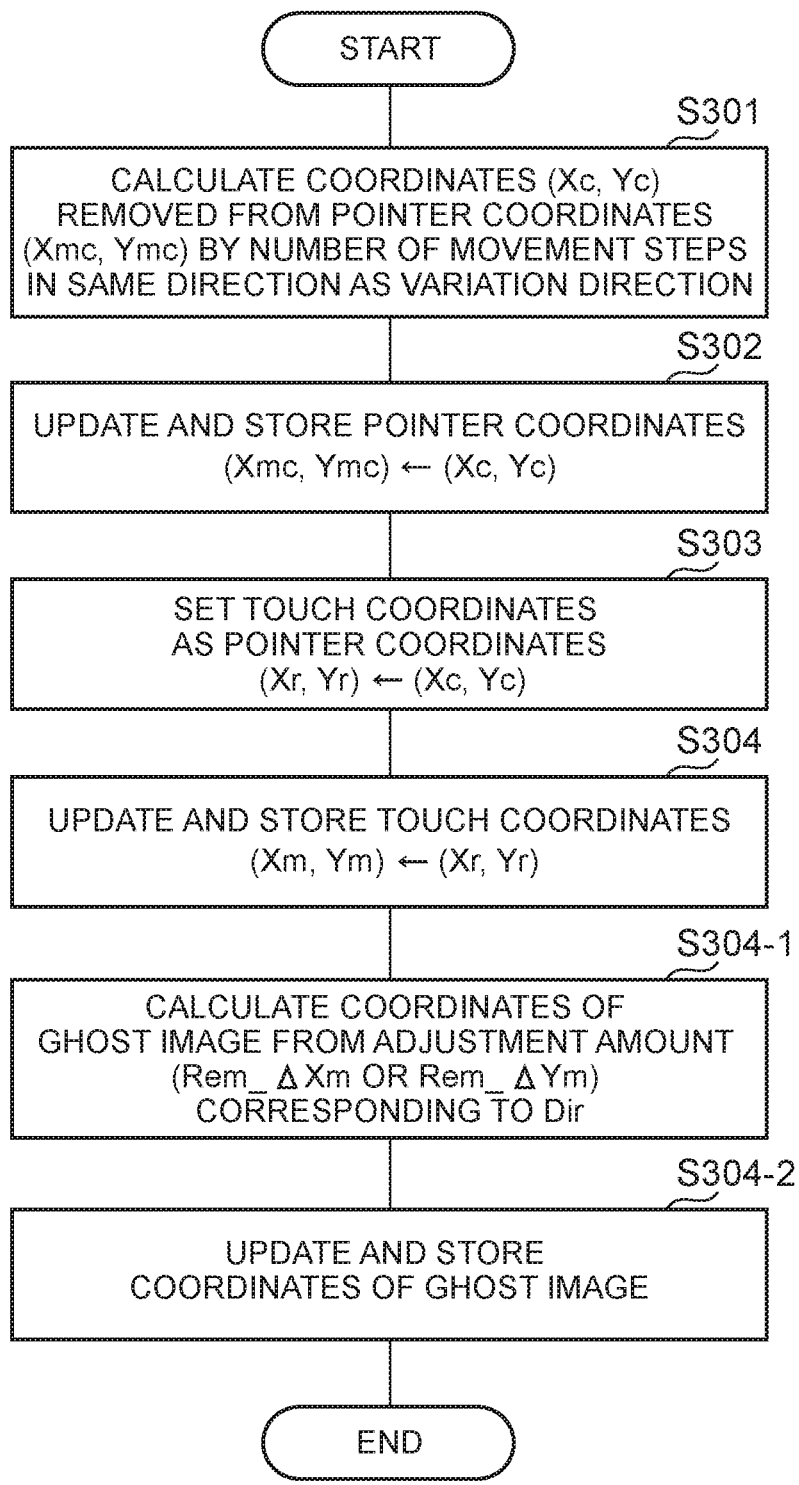

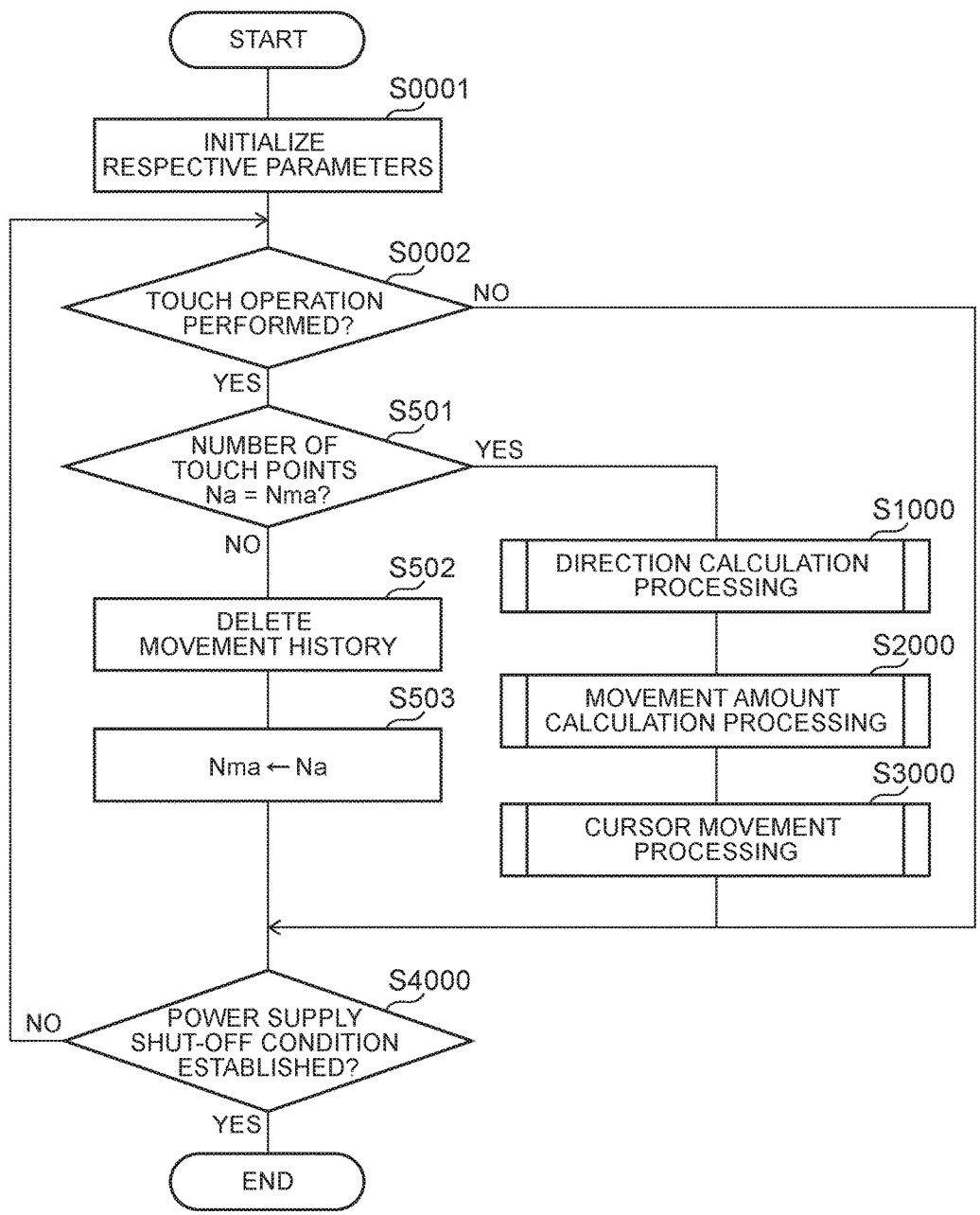

INPUT APPARATUS

INCORPORATION BY REFERENCE

The disclosure of Japanese Patent Application No. 2015-144299 filed on Jul. 21, 2015 including the specification, drawings and abstract is incorporated herein by reference in its entirety.

BACKGROUND OF THE INVENTION

1. Field of the Invention

The invention relates to an input apparatus that moves a cursor over a screen on the basis of input into a touchpad.

2. Description of Related Art

Japanese Patent Application Publication No. 2013-156980 (JP 2013-156980 A) describes an input apparatus in which an input region of a touchpad is divided into a plurality of partial regions and a different condition is used in each partial region to determine a movement direction of a finger touching the partial region. The input apparatus determines the movement direction and a moved distance of the finger in each partial region of the input region using a condition set for the corresponding partial region in accordance with a characteristic of the finger movement. Further, on the basis of the determination result obtained in the partial region, the input apparatus determines a movement direction, among up, down, left, and right directions, and a number of movements of a move key generated on a screen in order to operate a content selection graphical user interface (GUI) displayed on a monitor.

When a cursor displayed on a screen is moved in steps in a direction determined on the basis of remotely input touches, a movement amount of a touch input into a touchpad in order to move the cursor a single step may be determined in advance, and the cursor may be moved by converting the movement amount of the input touch into a number of steps at intervals of a predetermined period.

However, whereas the movement amount of the input touch is arbitrary, the number of steps of the cursor is an integer. Therefore, the movement amount of the cursor may not match the movement amount of the input touch, or in other words may not match an operation feeling of a user, and as a result, the user may experience a sense of discord.

SUMMARY OF THE INVENTION

The invention provides an input apparatus with which a movement amount of a cursor can be made to resemble an operation feeling of a user so that the user can perform in operations without experiencing a sense of discord.

A first aspect of the invention is An input apparatus including: a touchpad that detects an input position; a display unit; and a calculation device configured to: cause the display unit to display a cursor; move a display position of the cursor in steps in an identical direction to a variation direction of the input position detected by the touchpad every time the input position varies in an identical direction by a predetermined unit amount; calculate the variation direction of the input position detected by the touchpad at intervals of a predetermined period; calculate a displacement amount of the input position detected by the touchpad at intervals of the predetermined period; calculate a quotient and a remainder obtained by dividing the displacement amount by the predetermined unit amount, the quotient being calculated as a number of movement steps of the cursor, the remainder being calculated as an adjustment amount; move in steps the display position of the cursor by the number of movement steps in an identical direction to the variation direction of the input position; and calculate the number of movement steps and the adjustment amount by dividing a value by the predetermined unit amount when the variation direction of the input position calculated during a first predetermined period is equal to a variation direction of the input position calculated during a second predetermined period, the value obtained by adding the adjustment amount calculated during the second predetermined period to the displacement amount calculated during the first predetermined period, the second predetermined period being a predetermined period immediately preceding the first predetermined period.

According to the aspect described above, the movement amount of the cursor can be made to resemble the operation feeling of the user of the input apparatus, and as a result, the user can perform operations without experiencing a sense of discord.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a flowchart illustrating processing procedures according to the first modified example; and FIG. 10 is a flowchart illustrating processing procedures according to a second modified example of this embodiment of the invention.

DETAILED DESCRIPTION OF EMBODIMENTS

An input apparatus according to the invention divides an amount by which an input position is displaced over a predetermined period, the input position being detected by a touchpad, by a predetermined unit amount, and calculates the quotient and the remainder as a number of movement steps of a cursor and an adjustment amount, respectively. When the input position varies in an identical direction over two consecutive periods, the number of movement steps and the adjustment amount are calculated by dividing a value obtained by adding the adjustment amount calculated in the immediately preceding period to the displacement amount calculated in the current period by the predetermined unit amount. As a result, a movement amount of an input operation that was not reflected in movement of the cursor during the immediately preceding period is used to calculate the number of movement steps of the cursor in the current period, and therefore the movement amount of the input operation resembles the movement amount of the cursor over the entirety of the consecutive periods.

An embodiment of the input apparatus provided by the invention will be described in sequence below with reference to the drawings.

Figure 1:
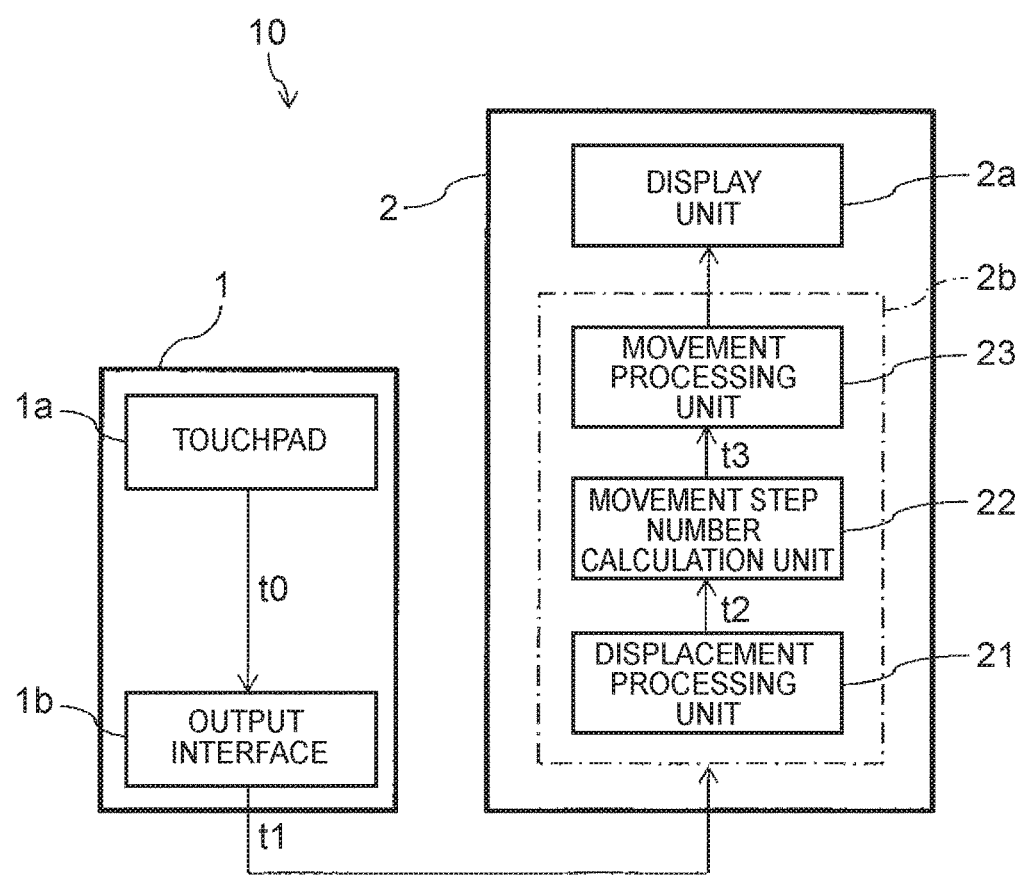
FIG. 1 is a block diagram showing a configuration of an input apparatus according to an embodiment of this invention.

FIG. 1 is a schematic view illustrating a configuration of an input apparatus 10 according to an embodiment of the invention. The input apparatus 10 is provided as a console apparatus of a vehicle, for example, and includes a pointing device 1 and a display device 2.

The pointing device 1 is a touchpad type remotely operated device, and includes a touchpad 1a and an output interface 1b.

Figure 2:
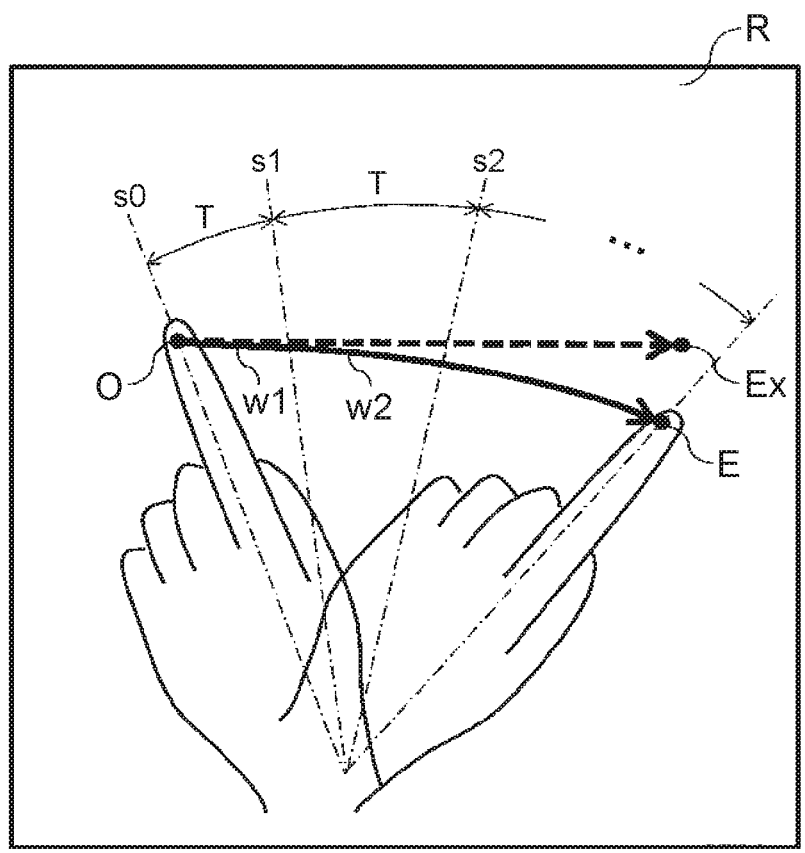
FIG. 2 is a view illustrating operations input by means of touch operations.

As shown in FIG. 2, the touchpad 1a includes a pad region R in which operations are input by performing touch operations, and an input position detection circuit provided on a back surface side of the pad region R. The touchpad 1a uses the input position detection circuit to detect an input position of an operation input into the pad region R. The touchpad 1a detects the input position at sampling timings (s1, s2, . . . ) occurring at intervals of a period (a predetermined period) T of no more than 50 msec, for example. Input position information t0 indicating the detected input position is input into the output interface 1b. In FIG. 2, the period T is set to be extremely large to make the drawing clearer, but the length of the period T may be set as desired.

Variation in the input position within the pad region R over each period T is processed by the display device 2 as an operation input by a user. FIG. 2 shows a trajectory OE generated when the user slides (swipes) a finger over the pad region R from an operation start point (touch ON) O to an operation end point (touch OFF) E, as shown by a solid line arrow. The trajectory OE is formed by a plurality of consecutive input operations divided by the periods T. Here, FIG. 2 shows an example in which an input operation w1 and an input operation w2 are performed from a sampling timing s0 to a sampling timing s1 and from the sampling timing s1 to a sampling timing s2, respectively, in order from the operation start point O side, and further operations are input between subsequent sampling timings.

When the user intends to draw a trajectory OEx extending in a horizontal direction from the operation start point O to an operation end point Ex, as shown by a dotted line arrow, the hand that performs the touch operation may rotate about the wrist or the like so as to deviate from the horizontal direction, and as a result, the user may accidentally draw the trajectory OE. Therefore, the input operations that deviate from the intended trajectory are corrected by the display device 2, as will be described below.

The output interface 1b converts the input position information t0 input from the touchpad 1a into coordinate information t1 in a format that can be processed by the display device 2, and outputs the coordinate information t1. The output coordinate information t1 is input into a displacement processing unit 21 of the display device 2, to be described below.

The display device 2 includes a display unit 2a and a display control unit (controller) 2b. Further, the display control unit 2b includes the displacement processing unit (a direction calculation unit and a displacement amount calculation unit) 21, a movement step number calculation unit 22, and a movement processing unit 23. Note that all or a part of the display control unit 2b may be provided in the pointing device 1 (between the touchpad 1a and the output interface 1b, for example). The display device 2 also includes a storage medium (memory) that updates and stores respective parameter values used in processing executed by the display unit 2a and the display control unit 2b. The display control unit is constituted by a calculation device that is connected to the storage medium, the output interface 1b, and the display unit 2a via a communication bus. The calculation device receives a signal from the output interface 1b, executes processing to be described below by performing calculations, and outputs a signal for displaying an image on the display unit 2a on the basis of calculation results.

Figure 3:
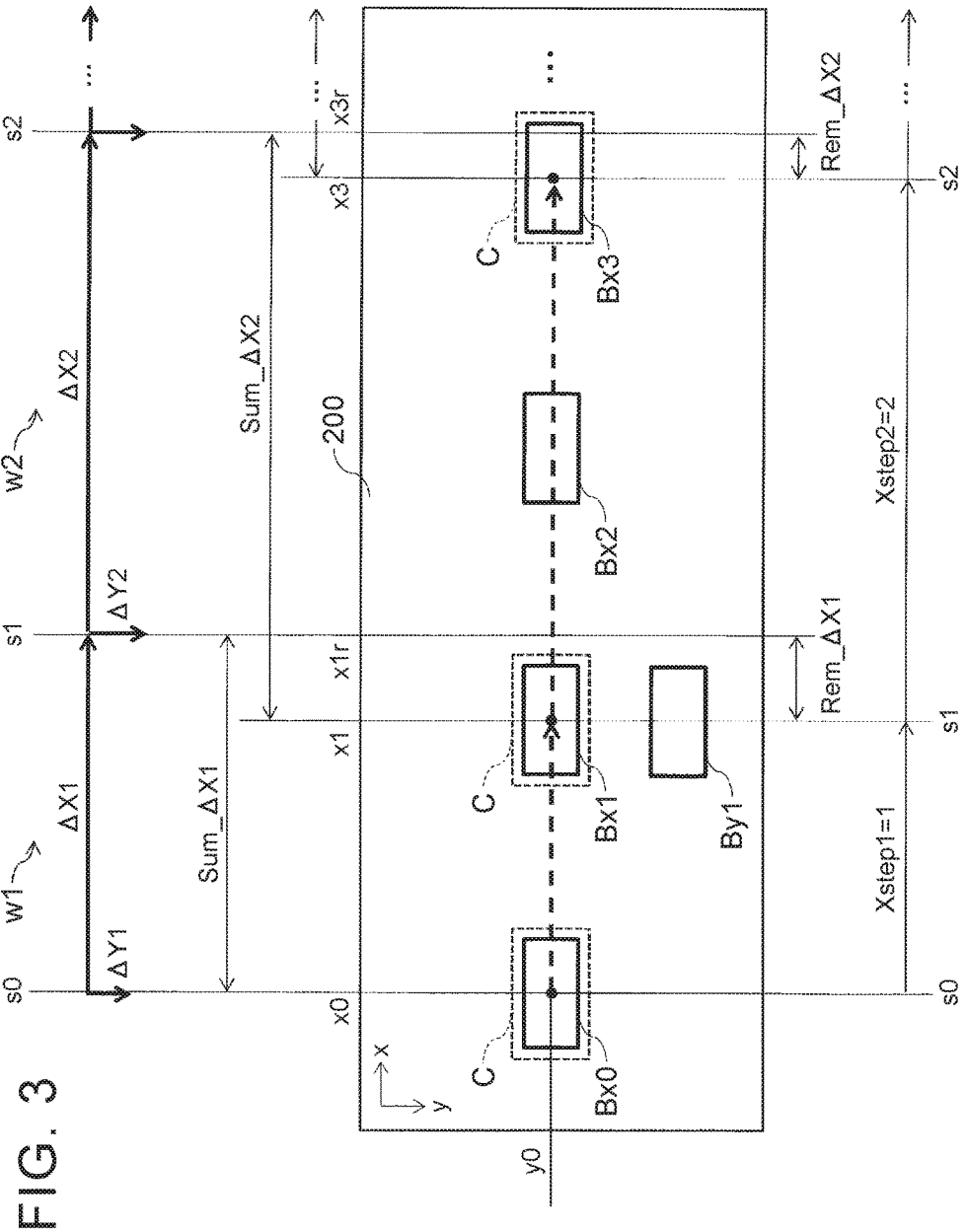
FIG. 3 is a view illustrating, by means of a screen layout, processing executed by the input apparatus from detection of an input operation amount to cursor movement.

The display unit 2a is constituted by a liquid crystal display device or an organic EL display device, for example. As shown in FIG. 3, the display unit 2a displays a screen 200 depicting a plurality of operation buttons for operating in-vehicle devices. A rightward direction on the screen 200 is set as a positive direction of an x axis, and a downward direction on the screen 200 is set as a positive direction of a y axis. Here, as the plurality of operation buttons, operation buttons Bx0, Bx1, Bx2, Bx3, . . . are arranged in order in the x axis direction and operation buttons Bx1, By1 are arranged in order in the y axis direction. The operation buttons are selection regions in which selections can be made using a cursor C. The cursor C moves over the screen so as to select one of the plurality of operation buttons in accordance with a detection result obtained in response to an operation input into the display device 2 from the pointing device 1.

Directions in which the cursor C can move are defined as any one of four directions constituted by positive and negative directions of the x axis and positive and negative directions of the y axis. Here, the position of the cursor C (indicated by a central position in a cursor region, for example) is shown to move in the positive direction of the x axis from an x coordinate position x0 for selecting the operation button Bx0 to an x coordinate position x1 for selecting the operation button Bx1 in response to the input operation w1, and from the x coordinate position x1 for selecting the operation button Bx1 to an x coordinate position x3 for selecting the operation button Bx3 in response to the input operation w2. Thus, at each sampling timing, the cursor C moves so as to select the operation button in the position corresponding to the input operation.

Note that in FIG. 3, the operation buttons are disposed at equal intervals in the x axis direction in order to simplify the following description, but the disposal intervals may be set as desired.

The display control unit 2b displays the cursor C on the display unit 2a. Further, every time the input position detected by the touchpad 1a varies by a predetermined unit amount in an identical direction, the display control unit 2b moves the display position of the cursor C in steps in an identical direction to the variation direction of the input position. Functions of the respective units (the displacement processing unit 21, the movement step number calculation unit 22, and the movement processing unit 23) constituting the display control unit 2b will be described below.

When input positions of a touch operation are detected continuously at consecutive sampling timings, the coordinate information t1 is input into the displacement processing unit 21 from the output interface 1b of the pointing device 1 in each period T. The displacement processing unit 21 calculates a component $\Delta X$ and a component $\Delta Y$ serving respectively as an x axis component and a y axis component of an input coordinate displacement generated between sampling timings from the coordinate information t1 obtained at two consecutive sampling timings.

When the component $\Delta X$ is a displacement component in the positive direction of the x axis, the component $\Delta X$ takes a value having a positive sign appended to the magnitude of the displacement component, and when the component $\Delta X$ is a displacement component in the negative direction of the x axis, the component $\Delta X$ takes a value having a negative sign appended to the magnitude of the displacement component. When the component $\Delta Y$ is a displacement component in the positive direction of the y axis, the component $\Delta Y$ takes a value having a positive sign appended to the magnitude of the displacement component, and when the component $\Delta Y$ is a displacement component in the negative direction of the y axis, the component $\Delta Y$ takes a value having a negative sign appended to the magnitude of the displacement component. When the x axis component of the input coordinate displacement is zero, $\Delta X=0$ is set, and when the y axis component of the input coordinate displacement is zero, $\Delta Y=0$ is set. Note that the component $\Delta X$ and the component $\Delta Y$ may be calculated in the output interface 1b of the pointing device 1 as information indicating an input coordinate displacement generated between two consecutive sampling timings, and this information may constitute a single set of the coordinate information t1.

FIG. 3 shows a component $\Delta X1$ and a component $\Delta Y1$ serving respectively as the component $\Delta X$ and the component $\Delta Y$ of an input coordinate displacement generated by the input operation w1. FIG. 3 also shows a component $\Delta X2$ and a component $\Delta Y2$ serving respectively as the component $\Delta X$ and the component $\Delta Y$ of an input coordinate displacement generated by the input operation w2.

The displacement processing unit 21 functions as the direction calculation unit in order to calculate the variation direction of the input position detected by the touchpad 1a in each period T on the basis of the component $\Delta X$ and the component $\Delta Y$. More specifically, the displacement processing unit 21 calculates a direction indicated by the sign of the component (in FIG. 3, the component $\Delta X1$ and the component $\Delta X2$) having a relatively larger magnitude, among the component $\Delta X$ and the component $\Delta Y$, as the variation direction. When the components have equal magnitudes, the component in a single predetermined direction is considered to be relatively larger. Further, the displacement processing unit 21 functions as the displacement amount calculation unit in order to calculate the magnitude of the component having the variation direction of the input position (in FIG. 3, the displacement amount of the input operation w1 is $|\Delta X1|$ and the displacement amount of the input operation w2 is $|\Delta X2|$) as a displacement amount of the input position. Calculation of the variation direction and the displacement amount will be described in detail below in the description of direction calculation processing.

Further, the displacement processing unit 21 inputs displacement processing information t2 indicating that the variation direction of the input position and the displacement amount of the input position have been calculated into the movement step number calculation unit 22.

Upon reception of the displacement processing information t2 from the displacement processing unit 21, the movement step number calculation unit 22 divides the displacement amount calculated by the displacement processing unit 21 by a predetermined unit amount, sets a quotient, which is expressed by an integer part, as a number of steps (referred to hereafter as a "number of movement steps") to be moved by the cursor C, and sets a remainder, which is expressed by a part other than the integer part, as an adjustment amount. When the displacement amount corresponds to the magnitude of the component $\Delta X$, the movement step number calculation unit 22 calculates a number of movement steps Xstep in the direction of the x axis, and when the displacement amount corresponds to the magnitude of the component $\Delta Y$, the movement step number calculation unit 22 calculates a number of movement steps Ystep in the direction of the y axis. The movement step number calculation unit 22 updates an adjustment amount Rem_$\Delta$Xm and an adjustment amount Rem_$\Delta$Ym to the adjustment amount calculated together with the number of movement steps Xstep and the adjustment amount calculated together with the number of movement steps Ystep, respectively, and stores the updated adjustment amounts Rem_$\Delta$Xm and Rem_$\Delta$Ym.

Further, when the variation direction of the input position, calculated by the displacement processing unit 21, is equal to the variation direction of the input position calculated by the displacement processing unit 21 in the immediately preceding period T, the movement step number calculation unit 22 calculates the number of movement steps and the adjustment amount by dividing a value obtained by adding the adjustment amount calculated by the displacement processing unit 21 in the immediately preceding period T to the displacement amount calculated by the displacement processing unit 21 by the predetermined unit amount.

In FIG. 3, the movement step number calculation unit 22 calculates a number of movement steps Xstep1 (1, for example) serving as the number of movement steps Xstep and an adjustment amount Rem_$\Delta$X1 that is stored as the adjustment amount Rem_$\Delta$Xm by dividing the displacement amount $|\Delta X1|$ of the input operation w1 by the predetermined unit amount. Further, the movement step number calculation unit 22 calculates a number of movement steps Xstep2 (2, for example) serving as the number of movement steps Xstep and an adjustment amount Rem_$\Delta$X2 that is stored as the adjustment amount Rem_$\Delta$Xm by dividing a value obtained by adding the adjustment amount Rem_$\Delta$Xm (=Rem_$\Delta$X1) to the displacement amount $|\Delta X1|$ of the input operation w1 by the predetermined unit amount. Calculation of the number of movement steps and the adjustment amount will be described in detail below in the description of movement step number calculation processing. Furthermore, the movement step number calculation unit 22 inputs movement amount calculation information t3 indicating that the number of movement steps has been calculated into the movement processing unit 23.

Upon reception of the movement amount calculation information t3, the movement processing unit 23 causes the display unit 2a to move the display position of the cursor C in the same direction as the variation direction of the input position, calculated by the direction calculation unit, by the number of movement steps calculated by the movement step number calculation unit 22.

Figure 4:
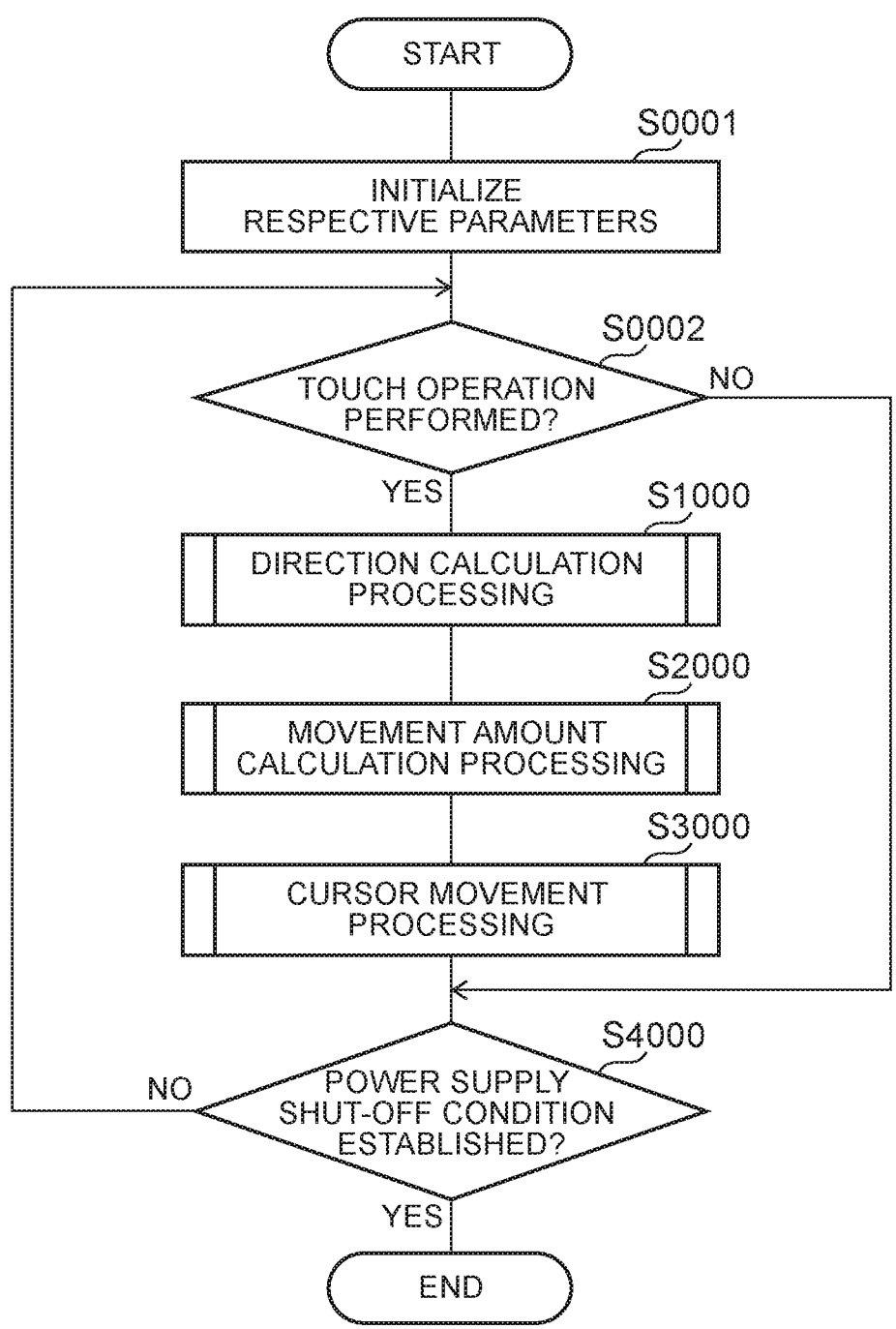
FIG. 4 is a flowchart illustrating overall processing procedures executed by the input apparatus.
Figure 5:
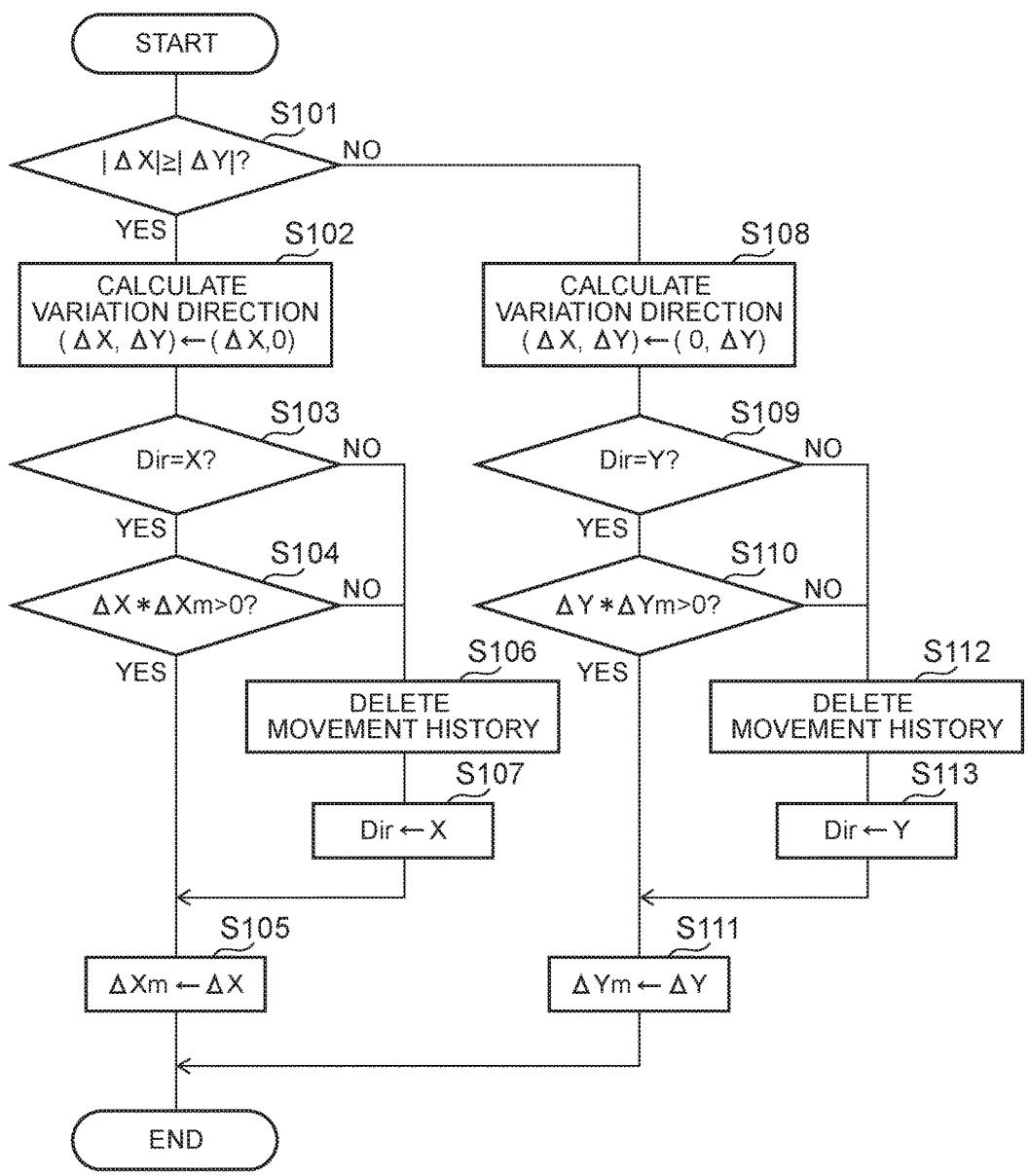
FIG. 5 is a flowchart illustrating processing procedures executed by the input apparatus to determine a movement direction of a cursor.
Figure 6:
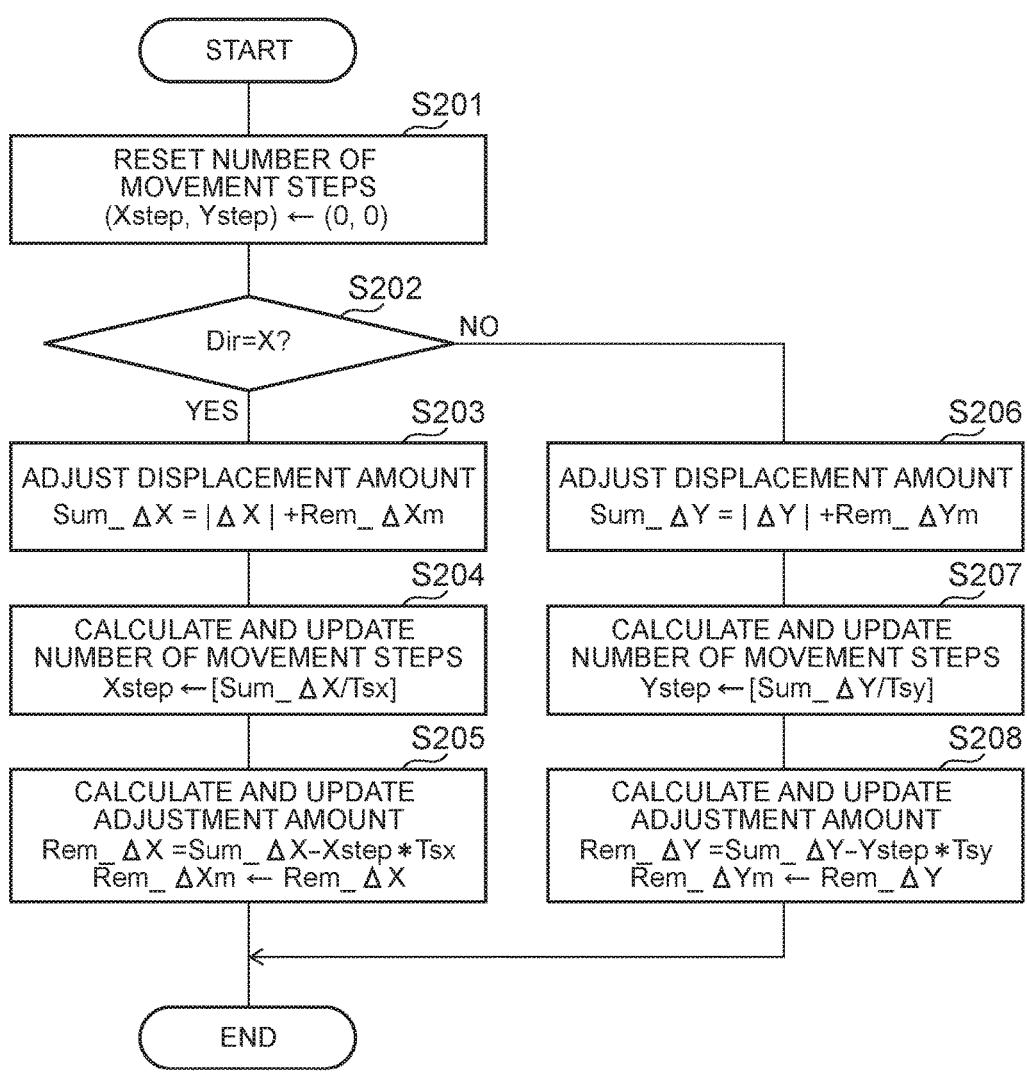
FIG. 6 is a flowchart illustrating processing procedures executed by the input apparatus to calculate a movement amount of the cursor.
Figure 7:
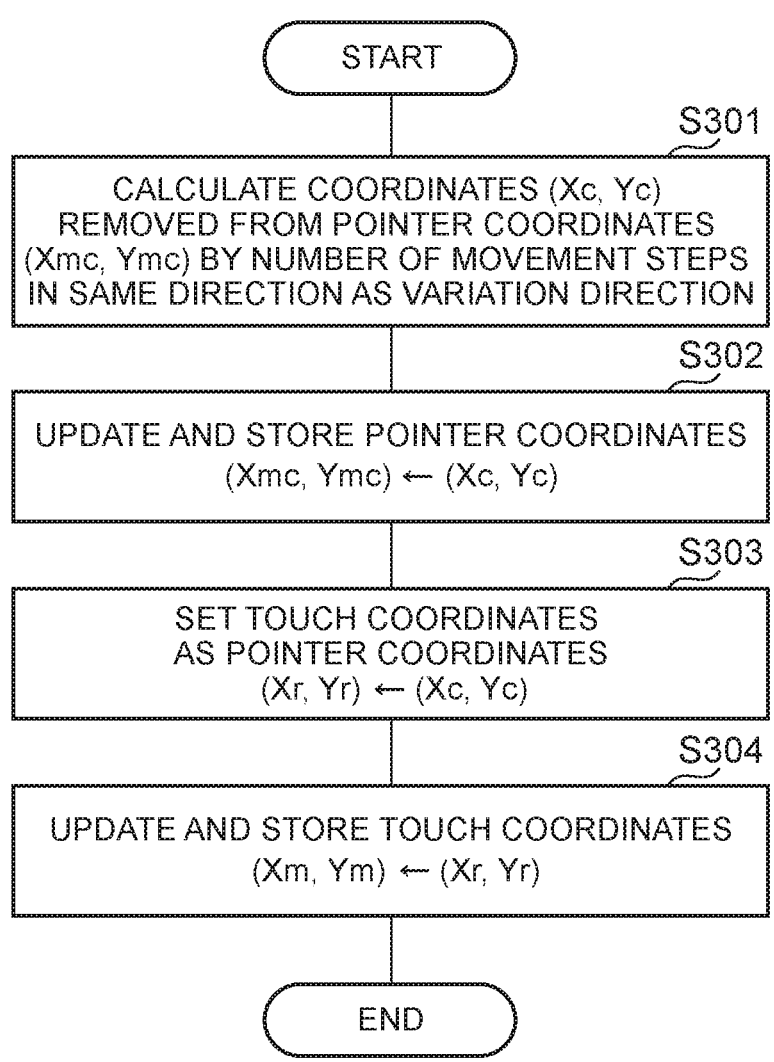
FIG. 7 is a flowchart illustrating processing procedures executed by the input apparatus to move the cursor.

Next, processing procedures executed by the input apparatus 10 having the above configuration will be described. FIG. 4 is a flowchart showing overall processing executed by the input apparatus 10. FIGS. 5, 6, and 7 are flowcharts showing the routine processing included in FIG. 4 in detail. All of the flows are performed as calculations by having a processor of a computer included in the input apparatus 10 execute a program stored in a storage medium of the computer. A register, for example, is used as the storage medium that stores the respective parameter values.

In FIG. 4, when a power supply of the input apparatus 10 is switched ON, first, in step S0001, the input apparatus 10 initializes the respective parameters shown in FIG. 1.

Next, in step S0002, a determination as to whether or not a touch operation has been performed on the touchpad 1a is made by determining whether or not the coordinate information t1 has been input into the display device 2 from the pointing device 1. When a touch operation has been performed in step S0002, the routine advances to step S1000, and when a touch operation has not been performed in step S0002, the routine advances to step S4000.

In step S1000, the input apparatus 10 executes direction calculation processing. The displacement processing unit 21 calculates the variation direction of the input position and the displacement amount of the input position on the basis of the coordinate information t1 input from the pointing device 1, and inputs the displacement processing information t2 into the movement step number calculation unit 22.

In step S2000 following step S1000, the input apparatus 10 executes movement amount calculation processing. The movement step number calculation unit 22 calculates the number of movement steps of the cursor C on the basis of the displacement processing information t2 input from the displacement processing unit 21.

In step S3000 following step S2000, the movement processing unit 23 causes the display unit 2a to move the cursor C by the calculated number of movement steps in the same direction as the variation direction of the input position on the basis of the movement amount calculation information t3 input from the movement step number calculation unit 22. Following step S3000, the routine advances to step S4000.

In step S4000, a determination is made as to whether or not a condition (for example, an operation performed by the user to switch a power supply switch OFF) for shutting off the power supply of the input apparatus 10 is established. When the condition is established in step S4000, the flow is terminated, and when the condition is not established in step S4000, the routine returns to step S0002.

FIG. 5 is a flowchart showing in detail the direction calculation processing serving as a part of the routine processing included in FIG. 4. Direction candidates envisaged in this flow are assumed to be identical to the directions illustrated in FIG. 3.

First, in step S101, the displacement processing unit 21 calculates the component $\Delta X$ and the component $\Delta Y$ on the basis of the coordinate information t1, received from the pointing device 1. The displacement processing unit 21 then determines whether or not $|\Delta X| \geq |\Delta Y|$. When $|\Delta X| \geq |\Delta Y|$ is established in step S101, the routine advances to step S102, and when $|\Delta X| \geq |\Delta Y|$ is not established, the routine advances to step S108.

Steps S102 to S107 relate to processing performed in a case where the variation direction of the input position is either the positive or the negative direction of the x axis. Steps S108 to S111, meanwhile, relate to processing performed in a case where the variation direction of the input position is either the positive or the negative direction of the y axis.

Direction information ($\Delta X$, $\Delta Y$) is stored in the display device 2 as a parameter that is set at ($\Delta X$, 0) when the variation direction of the input position is the direction indicated by the sign of $\Delta X$, and at (0, $\Delta Y$) when the variation direction of the input position is the direction indicated by the sign of $\Delta Y$. In step S102, the displacement processing unit 21 sets the direction information ($\Delta X$, $\Delta Y$) at ($\Delta X$, 0).

Next, in step S103, the displacement processing unit 21 checks a direction axis Dir serving as a parameter that indicates the coordinate axis of the variation direction of the input position during the immediately preceding period. When the coordinate axis is the x axis, Dir=X is set, and when the coordinate axis is the y axis, Dir=Y is set. The displacement processing unit 21 determines whether or not the checked direction axis Dir is set at Dir=X. When Dir=X is set in step S103, the routine advances to step S104, and when Dir=X is not set in step S103, the routine advances to step S106.

A component $\Delta Xm$ to which the component $\Delta X$ is updated when the direction information ($\Delta X$, $\Delta Y$) is at ($\Delta X$, 0) is stored in the display device 2 as a parameter. In step S104, the displacement processing unit 21 determines whether or not a product of the component $\Delta X$ indicating that the direction information ($\Delta X$, $\Delta Y$)=($\Delta X$, 0) and the previously updated and stored component $\Delta Xm$ is a positive value ($\Delta X \times \Delta Xm > 0$), or in other words whether or not the component $\Delta X$ and the component $\Delta Xm$ are oriented in the same direction (either the positive direction of the x axis or the negative direction of the x axis). When the product is positive in step S104, the routine advances to step S105, and when the product is not positive in step S104, the routine advances to step S106.

In step S105, the displacement processing unit 21 updates the component $\Delta X$ to the component $\Delta Xm$ and stores the updated component $\Delta Xm$.

Further, in step S106, the displacement processing unit 21 deletes a past movement history. The deleted movement history includes the adjustment amount Rem_$\Delta Xm$ and the adjustment amount Rem_$\Delta Ym$, which are updated and stored in step S205 and step S208, respectively, of FIG. 6, to be described below. Next, in step S107, the direction axis Dir is updated to and stored as Dir=X. Following step S107, the routine advances to step S105.

In step S108, the displacement processing unit 21 sets the direction information ($\Delta X$, $\Delta Y$) at (0, $\Delta Y$).

Next, in step S109, the displacement processing unit 21 checks the direction axis Dir to determine whether or not Dir=Y. When Dir=Y is set in step S109, the routine advances to step S110, and when Dir=Y is not set in step S109, the routine advances to step S112.

A component $\Delta Ym$ to which the component $\Delta Y$ is updated when the direction information ($\Delta X$, $\Delta Y$) is at (0, $\Delta Y$) is stored in the display device 2 as a parameter. In step S110, the displacement processing unit 21 determines whether or not a product of the component $\Delta Y$ indicating that the direction information ($\Delta X$, $\Delta Y$)=(0, $\Delta Y$) and the previously updated and stored component $\Delta Ym$ is a positive value ($\Delta Y \times \Delta Ym > 0$), or in other words whether or not the component $\Delta Y$ and the component $\Delta Ym$ are oriented in the same direction (either the positive direction of the y axis or the negative direction of the y axis). When the product is positive in step S110, the routine advances to step S111, and when the product is not positive in step S110, the routine advances to step S112.

In step S111, the displacement processing unit 21 updates the component $\Delta Y$ to the component $\Delta Ym$ and stores the updated component $\Delta Ym$.

Further, in step S112, the displacement processing unit 21 deletes the past movement history. The deleted movement history includes the adjustment amount Rem_$\Delta Xm$ and the adjustment amount Rem_$\Delta Ym$, which are updated and stored in step S205 and step S208, respectively, of FIG. 6, to be described below. Next, in step S113, the direction axis Dir is updated to and stored as Dir=Y. Following step S113, the routine advances to step S111.

Next, FIG. 6 is a flowchart showing in detail the movement amount calculation processing serving as a part of the routine processing included in FIG. 4.

A set (Xstep, Ystep) of respective numbers of movement steps in the x axis direction and the y axis direction is stored in the display device 2 as a parameter. First, in step S201, the movement step number calculation unit 22 resets the set (Xstep, Ystep) of numbers of movement steps to (0, 0).

Next, in step S202, the movement step number calculation unit 22 checks the direction axis Dir to determine whether or not Dir=X. When Dir=X is set in step S202, the routine advances to step S203, and when Dir=X is not set, the routine advances to step S206. In steps S203 to S205, calculations are performed in relation to the number of movement steps Xstep, and in steps S206 to S208, calculations are performed in relation to the number of movement steps Ystep.

In step S203, the movement step number calculation unit 22 calculates an input sum amount Sum_$\Delta$X by adding the stored adjustment amount Rem_$\Delta$Xm to the component $\Delta$X of the current period T, which is stored as the component $\Delta$Xm in step S105 of FIG. 5. In other words, Sum_$\Delta$X=|$\Delta$X|+Rem_$\Delta$Xm. Here, the adjustment amount Rem_$\Delta$Xm has an initial value of zero. In FIG. 3, therefore, an input sum amount Sum_$\Delta$X1 serving as the input sum amount Sum_$\Delta$X of the input operation w1 is equal to |$\Delta$X1|. Thus, the movement step number calculation unit 22 adjusts the displacement amount of the input position by the adjustment amount Rem_$\Delta$Xm.

Next, in step S204, the movement step number calculation unit 22 calculates a quotient obtained when the input sum amount Sum_$\Delta$X is divided by a constant Tsx (a positive number) as the number of movement steps Xstep. In other words, Xstep=[Sum_$\Delta$X/Tsx], where [ ] is a Gauss symbol. The constant Tsx is a unit amount (a threshold amount) of an input required to move the cursor C along the x axis to the adjacent operation button. In other words, every time the input position varies by a displacement amount having a magnitude that corresponds to the constant Tsx in the x axis direction, the cursor C moves one step in the same direction as the variation direction of the input position. The movement step number calculation unit 22 updates the set (Xstep, Ystep) of number of movement steps by setting Xstep and Ystep at the calculated value and zero, respectively, and stores the updated set (Xstep, Ystep). The number of movement steps Xstep is an integer no smaller than zero.

Next, in step S205, the movement step number calculation unit 22 calculates the adjustment amount Rem_$\Delta$X generated by the operation input during the current period T from Rem_$\Delta$X Sum_$\Delta$X-Xstep$\times$Tsx, updates Rem_$\Delta$Xm to the calculated adjustment amount Rem_$\Delta$X, and stores the updated adjustment amount Rem_$\Delta$Xm. Note that the movement step number calculation unit 22 updates the adjustment amount Rem_$\Delta$Xm to the calculated adjustment amount Rem_$\Delta$X and stores the updated adjustment amount Rem_$\Delta$Xm likewise with respect to an input operation in which the number of movement steps Xstep=0.

In step S206, the movement step number calculation unit 22 calculates an input sum amount Sum_$\Delta$Y by adding the stored adjustment amount Rem_$\Delta$Ym to the component $\Delta$Y of the current period T, which is stored as the component $\Delta$Ym in step S111 of FIG. 5. In other words, the displacement amount of the input position is adjusted by the adjustment amount Rem_$\Delta$Ym. Here, Sum_$\Delta$Y=|$\Delta$Y|+Rem_$\Delta$Ym.

In step S207, the movement step number calculation unit 22 calculates a quotient obtained when Sum_$\Delta$Y is divided by a constant Tsy (a positive number) as the number of movement steps Ystep. In other words, Ystep=[Sum_$\Delta$Y/Tsy], where [ ] is a Gauss symbol. The constant Tsy is a unit amount (a threshold amount) of an input required to move the cursor C along the y axis to the adjacent operation button. In other words, every time the input position varies by a displacement amount having a magnitude that corresponds to the constant Tsy in the y axis direction, the cursor C moves one step in the same direction as the variation direction of the input position. The movement step number calculation unit 22 updates the set (Xstep, Ystep) of numbers of movement steps by setting Xstep and Ystep at zero and the calculated value, respectively, and stores the updated set (Xstep, Ystep). The number of movement steps Ystep is an integer no smaller than zero.

Next, in step S208, the movement step number calculation unit 22 calculates the adjustment amount Rem_$\Delta$Y generated by the operation input during the current period T from Rem_$\Delta$Y=Sum_$\Delta$Y-Ystep$\times$Tsy, updates Rem_$\Delta$Ym to the calculated adjustment amount Rem_$\Delta$Y, and stores the updated adjustment amount Rem_$\Delta$Ym. Note that the movement step number calculation unit 22 updates the adjustment amount Rem_$\Delta$Ym to the calculated adjustment amount Rem_$\Delta$Y and stores the updated adjustment amount Rem_$\Delta$Ym likewise with respect to an input operation in which the number of movement steps Ystep=0.

When either step S205 or step S208 is complete, the current flow is terminated.

Next, FIG. 7 is a flowchart showing in detail the cursor movement processing serving as a part of the routine processing included in FIG. 4.

First, in step S301, the movement processing unit 23 obtains pointer coordinates (Xmc, Ymc) stored as a parameter. The pointer coordinates (Xmc, Ymc) are represented by the position of the operation button selected by the cursor C (an address of central coordinates of the operation button region or the like, which is represented by an x coordinate and a y coordinate). The movement processing unit 23 calculates coordinates (Xc, Yc) of a position that is removed from the pointer coordinates (Xmc, Ymc) in the same direction as the variation direction of the input position indicated by the direction information ($\Delta$X, $\Delta$Y) by the numbers of movement steps included in the set (Xstep, Ystep) of numbers of movement steps.

Next, in step S302, the movement processing unit 23 updates the pointer coordinates (Xmc, Ymc) to the coordinates (Xc, Yc) calculated in step S301, and stores the updated pointer coordinates (Xmc, Ymc). Thus, the movement processing unit 23 moves the display position of the cursor C to the updated and stored pointer coordinates (Xmc, Ymc).

Next, in step S303, the movement processing unit 23 sets current touch coordinates (Xr, Yr) at (Xc, Ye), i.e. the pointer coordinates (Xmc, Ymc). In other words, the current touch coordinates (Xr, Yr) are updated to the position of the operation button serving as the movement destination of the cursor C.

Next, in step S304, the movement processing unit 23 updates touch coordinates (Xm, Ym) determined from the input operation to the current touch coordinates (Xr, Yr) set to be equal to the pointer coordinates (Xc, Yc), and stores the updated touch coordinates (Xm, Ym). Thus, when the next operation is input, the display device 2, into which the coordinate information t1 is input from the pointing device 1, executes processing on the assumption that the current touch coordinates (Xr, Yr) of the next input operation start from the updated and stored touch coordinates (Xm, Ym). When step S304 is complete, the current flow is terminated.

In FIG. 3, when the input operation w1 is applied from touch coordinates (x0, y0) corresponding to the operation start point O, the movement processing unit 23 moves the cursor C to coordinates (x1, y0) that are removed therefrom in the direction (the positive direction of the x axis) indicated by the sign of the component ΔX1 by the number of movement steps Xstep1. Next, when the input operation w2 is applied, the movement processing unit 23 moves the cursor C to coordinates (x3, y0) that are removed in the direction (the positive direction of the x axis) indicated by the sign of the component ΔX2 by the number of movement steps Xstep2. To calculate the number of movement steps Xstep2, an input sum amount Sum_ΔX2 is divided by the constant Tsx, the input sum amount Sum_ΔX2 being obtained by adding the adjustment amount Rem_ΔX1, which is calculated as the difference between a position x1r represented by x0+ΔX1 and the position x1, to the displacement amount |ΔX2|.

Figure 8:
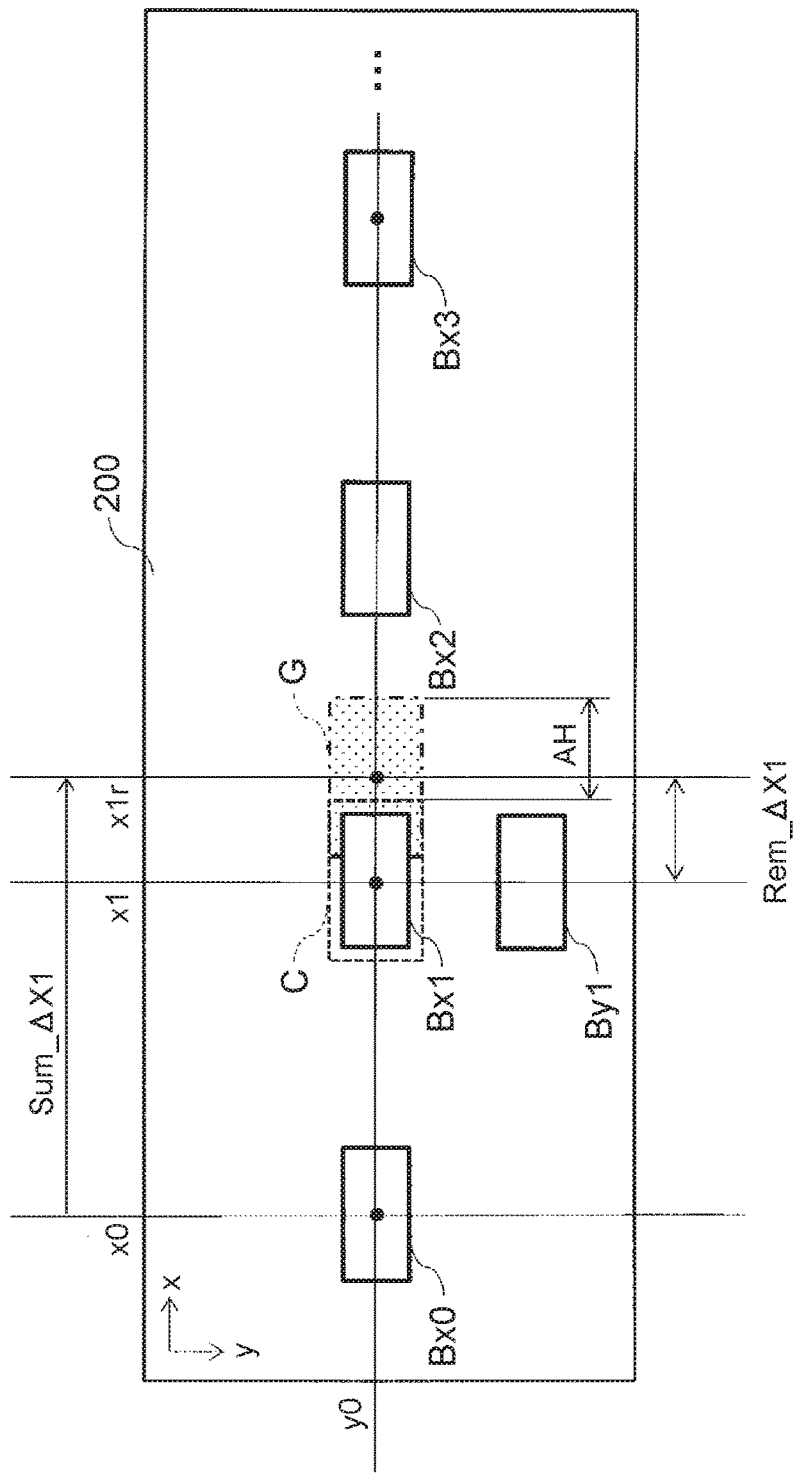
FIG. 8 is a view illustrating, by means of a screen layout, processing according to a first modified example of this embodiment of the invention.

FIGS. 8 and 9 show a first modified example of this embodiment. In this modified example, the adjustment amount Rem_ΔXm and the adjustment amount Rem_ΔYm are visualized on screen. FIG. 8 shows a condition in which the cursor C is moved by the input sum amount Sum_ΔX1 so as to select the operation button Bx1, for example. The display control unit 2b displays a ghost image G of the cursor C in a coordinate position (x1r, y0) removed from the position (x1, y0) of the operation button Bx1 in the direction of the component ΔX1 (the positive direction of the x axis) by Rem_ΔX1, which is stored as the adjustment amount Rem_ΔXm.

The ghost image G is an image mimicking the shape of the cursor C, for example, which is hidden beneath the image of the operation button Bx1 overlapping the region of the ghost image G and displayed in transparent or translucent fashion over the image of the cursor C overlapping the region of the ghost image G. The user can see that a movement direction tip end of the ghost image G is displayed away from a movement direction tip end of the cursor C by a coordinate displacement AH (=x1r−x1) corresponding to the adjustment amount Rem_ΔX1, for example, and as a result can recognize that the cursor C has effectively advanced to the x coordinate position x1r.

FIG. 9 is a flowchart illustrating processing executed to display the ghost image G. This flow is obtained by adding steps S304-1 and S304-2 to the flowchart shown in FIG. 7.

Step S304-1 is executed following step S304, for example. In step S304-1, the movement step number calculation unit 22 obtains the adjustment amount that corresponds to the direction axis Dir from the adjustment amount Rem_ΔXm and the adjustment amount Rem_ΔYm. Coordinates of the ghost image G are then calculated by adding the coordinate displacement AH corresponding to the obtained adjustment amount to the pointer coordinates (Xmc, Ymc) updated in step S302.

Next, in step S304-2, the movement step number calculation unit 22 updates and stores the coordinates of the calculated ghost image G. Thus, the movement processing unit 23 moves the display position of the cursor C and displays the ghost image G in a position corresponding to the movement destination cursor position. Note, however, that when the coordinates of the ghost image G match the pointer coordinates (Xmc, Ymc) serving as the movement destination of the cursor C, or in other words when the adjustment amount Rem_ΔXm or Rem_ΔYm corresponding to the direction axis Dir is zero, the movement processing unit 23 does not display the ghost image G.

FIG. 10 is a flowchart obtained by modifying the flowchart shown in FIG. 4. This flowchart is obtained by adding steps S501 to S503 to the flowchart shown in FIG. 6. Step S501 is performed after step S0002 when a touch operation has been input in step S0002. This flow will be described below together with parts from step S501 onward that are obtained by modifying FIG. 4.

An operation consisting of a plurality of touch points can be input into the touchpad 1a. In this case, first, in step S501, the input apparatus 10 determines whether or not a number of touch points Na of the current input operation is equal to a stored number of touch points Nma of the previous input operation. When Na=Nma is established in step S501, the processing of steps S1000 to S3000, illustrated in FIG. 4, is performed, whereupon the routine advances to step S4000. When Na=Nma is not established in step S501, the routine advances to step S502.

In step S502, since the current number of touch points is different to the previous number of touch points, it is determined that the current touch operation has been started as an input operation that is unrelated to the previous operation, and therefore the stored past movement history is deleted. Here, the deleted movement history includes the adjustment amount Rem_ΔXm and the adjustment amount Rem_ΔYm updated and stored in step S205 and step S208, respectively, of FIG. 6. Next, in step S503, the number of touch points Na of the input operation started at this time is stored as Nma. When step S503 is complete, the routine advances to step S4000.

Note that when the cursor is moved in response to an input operation consisting of a plurality of touch points, the processing of step S1000 to S3000 is executed in relation to an input operation corresponding to a single representative touch point determined in advance among the plurality of touch points, for example.

In the input apparatus 10 according to this embodiment, the movement step number calculation unit 22 calculates a quotient and a remainder by dividing the displacement amount (|ΔX|, |ΔY|) of the input position over a predetermined period (the period T) by the predetermined unit amount (the constant Tsx, the constant Tsy), sets the quotient as the number of movement steps (the number of movement steps Xstep, the number of movement steps Ystep) of the cursor C, and sets the remainder as the adjustment amount (the adjustment amount Rem_ΔX, the adjustment amount Rem_ΔY). When the input position varies in an identical direction over two consecutive periods, the movement step number calculation unit 22 calculates the number of movement steps and the adjustment amount by dividing a value (the input amount Sum_ΔX, the input sum amount Sum_ΔY) obtained by adding the adjustment amount (the adjustment amount Rem_ΔXm, the adjustment amount Rem_ΔYm) calculated in the immediately preceding period to the displacement amount calculated during the current period by the predetermined unit amount.

Hence, when the input position varies in the same direction over consecutive periods, the adjustment amount calculated during the immediately preceding period is carried over to calculation of the number of movement steps of the cursor C. As a result, the movement amount of the input operation that was not reflected in the movement of the cursor during the immediately preceding period is used to calculate the number of movement steps of the cursor C in the current period, and therefore the movement amount of the input operation resembles the cursor movement amount over the entirety of the consecutive periods.

Further, with the input apparatus 10 according to this embodiment, the ghost image G is displayed. Hence, the user, when inputting continuous operations, can recognize the ghost image G indicating the position of the cursor C when advanced by the adjustment amount, and can therefore confirm the position on screen corresponding to the movement amount of the input operation.

Hence, with the input apparatus 10 according to this embodiment, the movement amount of a cursor provided in an input apparatus that moves the cursor so as to select a desired selection region in response to an operation input into a touchpad can be made to resemble the operation feeling of a user of the input apparatus, and as a result, the user can perform operations without experiencing a sense of discord.

What is claimed is:

1. An input apparatus comprising:
a touchpad that detects an input position;
a display unit; and
a calculation device configured to:
    cause the display unit to display a cursor;
    move a display position of the cursor in steps in an identical direction to a variation direction of the input position detected by the touchpad every time the input position varies in a direction identical to a direction the input position varies before by a predetermined unit amount;
    calculate the variation direction of the input position detected by the touchpad at consecutive intervals each having a predetermined period for at least a first predetermined period and a second predetermined period;
    calculate a displacement amount of the input position detected by the touchpad at the consecutive intervals each having the predetermined period for at least the first predetermined period and the second predetermined period;
    calculate a quotient and a remainder by dividing the displacement amount by the predetermined unit amount for each of the consecutive intervals of the predetermined period for at least the first predetermined period and the second predetermined period; and
    move in steps the display position of the cursor by a number of movement steps in the identical direction to the variation direction of the input position, wherein
    when the variation direction of the input position calculated during the first predetermined period is equal to the variation direction of the input position calculated during the second predetermined period, the number of movement steps is calculated by dividing a value by the predetermined unit amount, and
    the value is obtained by adding the remainder calculated during the second predetermined period as an adjustment amount to the displacement amount calculated during the first predetermined period, the second predetermined period being a predetermined period immediately preceding the first predetermined period.

2. The input apparatus according to claim 1, wherein the calculation device is configured to display an image which indicates a coordinate position that is distanced, by an amount corresponding to the adjustment amount, from the display position of the cursor following movement of the cursor in steps by the number of movement steps in a movement direction of the display position of the cursor when the adjustment amount is not zero.

3. An input apparatus comprising:
a touchpad that detects an input position;
a display unit; and
a controller having a processor and memory, the controller configured to:
    cause the display unit to display a cursor;
    move a display position of the cursor in steps in an identical direction to a variation direction of the input position detected by the touchpad every time the input position varies in a direction identical to a direction the input position varies before by a predetermined unit amount;
    calculate the variation direction of the input position detected by the touchpad at consecutive intervals each having a predetermined period for at least a first predetermined period and a second predetermined period;
    calculate a displacement amount of the input position detected by the touchpad at the consecutive intervals each having the predetermined period for at least the first predetermined period and the second predetermined period;
    calculate a quotient and a remainder by dividing the displacement amount by the predetermined unit amount for each of the consecutive intervals of the predetermined period for at least the first predetermined period and the second predetermined period; and
    move in steps the display position of the cursor by a number of movement steps in the identical direction to the variation direction of the input position, wherein
    when the variation direction of the input position calculated during the first predetermined period is equal to the variation direction of the input position calculated during the second predetermined period, the number of movement steps is calculated by dividing a value by the predetermined unit amount, and
    the value is obtained by adding the remainder calculated during the second predetermined period as an adjustment amount to the displacement amount calculated during the first predetermined period, the second predetermined period being a predetermined period immediately preceding the first predetermined period.

4. The input apparatus according to claim 3, wherein the controller is configured to display an image which indicates a coordinate position that is distanced, by an amount corresponding to the adjustment amount, from the display position of the cursor following movement of the cursor in steps by the number of movement steps in a movement direction of the display position of the cursor when the adjustment amount is not zero.

* * * * *